Oct. 20, 1953  S. PANSKE  2,655,729
SQUARE ASSEMBLY HOLDER
Filed Aug. 7, 1952  2 Sheets-Sheet 1
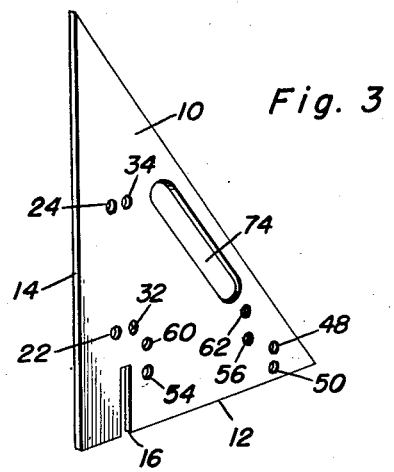
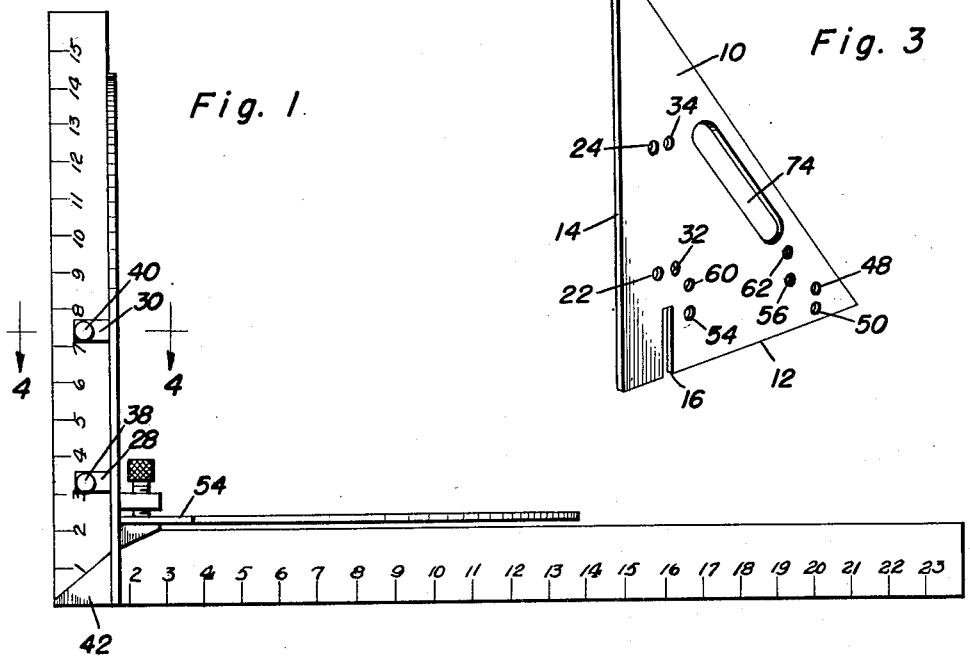
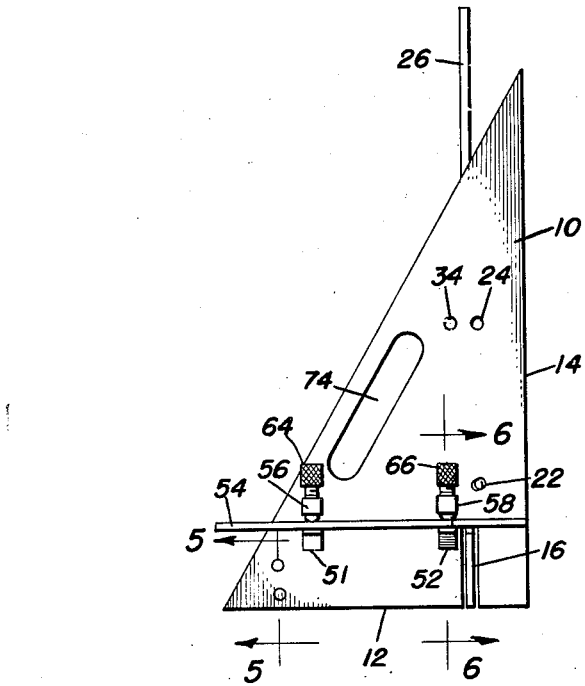
Sylvester Panske
INVENTOR.

Oct. 20, 1953
S. PANSKE
2,655,729
SQUARE ASSEMBLY HOLDER
Filed Aug. 7, 1952
2 Sheets-Sheet 2
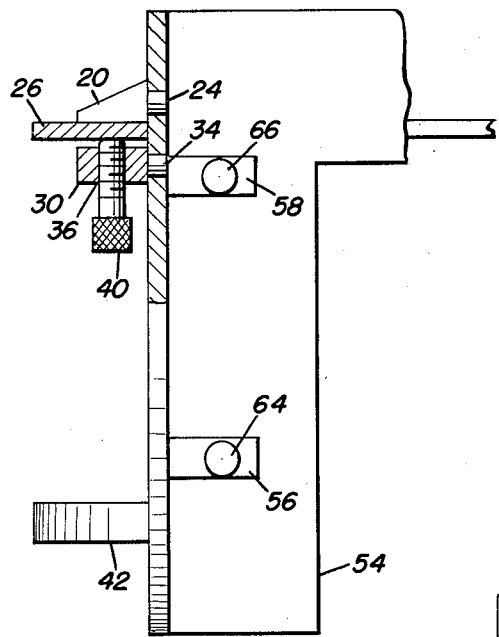
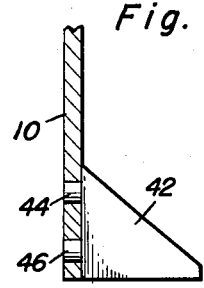
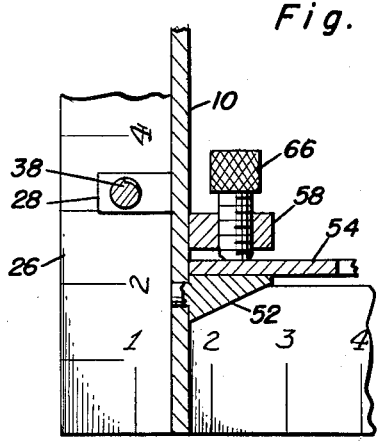
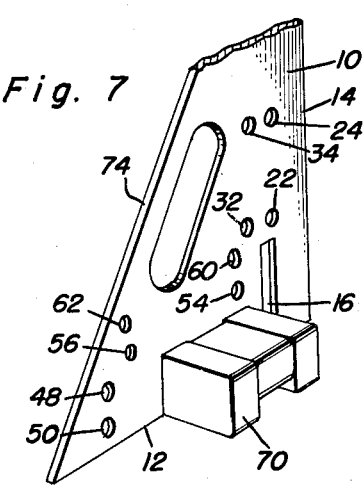
Sylvester Panske
*INVENTOR.*
BY *Clarence A. O'Brien
and Harvey B. Jacobson*
*Attorneys*

Patented Oct. 20, 1953

2,655,729

UNITED STATES PATENT OFFICE 2,655,729

SQUARE ASSEMBLY HOLDER

Sylvester Panske, Neenah, Wis.

Application August 7, 1952, Serial No. 303,124

5 Claims. (Cl. 33—90)

1

This invention relates to a square assembly holder and particularly to an improvement in a device for holding a carpenter's square for freeing the hands so that one man can do the work otherwise requiring two men.

In operations utilizing a steel square for layout work particularly in the metal welding trade for layout and set up work it is desirable to be able to utilize a square to measure in many directions and particularly to be able to measure over obstructions or pieces welded onto the layout assembly. Heretofore considerable difficulty has been encountered in doing such measuring and layout work because of the requirement of maintaining the square in exact relation while reading or measuring distances therewith. Heretofore this has been accomplished by having one man hold the square while another man does the actual reading or lay off work therewith.

The present invention provides a square holder for holding one or a plurality of squares so that the square will be substantially self held so that the workman may make the necessary readings or lay off measurements without the necessity of a second man to hold the square. The holder further provides means for measuring over obstructions such as jigs or portions of the fixtures and any distance up to the length of the body of the square. This is accomplished by means of a square holder having a clamping means for maintaining the body of a square in parallel relation to one edge of the holder and extending laterally therefrom so that the holder itself will be maintained in upright position by the presence of the square therein and that likewise the square will be maintained in position because of its relation to the holder. A second square may be mounted in perpendicular relation to the first square so that distances in any direction may be readily measured. In certain instances, particularly in welding layout work, it is desirable to have the holder self supporting and for this reason a magnet is frequently applied to the back of the holder plate so that the holder may be stuck to metal objects and supported thereby.

It is accordingly an object of the invention to provide an improved square assembly holder.

A further object of the invention is to provide a square assembly holder having means for mounting one or a plurality of squares in rigid relation to the holder.

It is a further object of the invention to provide a holder which may be magnetically attached to the work piece.

Other objects and many of the attendant advantages of the present invention will be apparent from the following detailed description taken in conjunction with the accompanying drawings, in which:

Figure 1 is a side elevation of the square assembly holder with both squares attached;

Figure 2 is a rear elevation of the square assembly holder showing the method of attaching the second square to the holder;

Figure 3 is a perspective view of the holder plate;

Figure 4 is a cross section taken substantially on the plane indicated by the line 4—4 of Figure 1 and indicating the method of clamping the square therein;

Figure 5 is a cross section taken substantially on the plane indicated by the line 5—5 of Figure 4 and shows the construction and connection of the preset stop for cooperating with the body of the square held in the holder;

Figure 6 is a cross section taken substantially on the plane indicated by the line 6—6 of Figure 2 and indicates the construction of the square stops for supporting the square in horizontal relation in the holder; and Figure 7 is a fragmentary perspective of the back of the square assembly holder showing a magnet attached thereto for securing the assembly holder in position on metallic work pieces.

In the exemplary embodiment of the invention a holder plate 10 preferably of triangular formation is provided with a first edge 12 and a second edge 14 arranged in perpendicular relation to each other. A slot 16 is provided in the first edge 12 and extends in spaced substantially parallel relation to the second edge 14 and is adapted to receive the tongue of an ordinary carpenter's square. A plurality of square stops 20 are mounted in apertures 22 and 24 on the face of the plate 10. The stops 20 provide a plurality of surfaces for maintaining a steel square 26 which extends through the slot 16 in vertical relation with respect to the first edge 12 and in parallel spaced relation to the second edge 14. Fastening blocks 28 and 30 are mounted in apertures 32 and 34 in the plate 10 and are provided with threaded apertures 36 for receiving set bolts 38 and 40 for clamping the body 26 of the square against the square stops 20.

A preset work stop 42 is provided with lugs 44 and 46 which engage the apertures 48 and 50 in the plate 10 in proximity to the first edge 12 and in spaced relation to the slot 16. The work stop 42 is of the same height as the width of the body 26 of the carpenter's square and in the usual 12" carpenter's square the body 26 will have a width of 1½" so that the work stop 42 will be of a height 1½". However, it will be apparent that the height of the work stop 42 may be any desired height to cooperate with any desired size of square body 26.

A second set of square stops 51 and 52 are mounted in the apertures 54 and 56 and extend rearwardly on the plate 10. The stops 51 and 52 are adapted to maintain the body 54 of a second steel square in parallel relation to the edge 12 and perpendicular to the edge 14. Clamping blocks 56 and 58 are mounted in apertures 60 and 62 and are adapted to receive setscrews 64 and 66 for clamping the body 54 of the steel square on the square stops 51 and 52.

In the utilization of the square assembly holder on metal work such as welding layout work it is frequently desirable to provide means for supporting the holder and the square held thereby against the metal objects being operated on. For this reason a magnet 70 having a pull of approximately 40 pounds is rigidly mounted on the backside of the plate 10 and has sufficient tenacity to hold the holder together with the square supported thereby on the usual layout work.

Preferably the various stops and blocks connected to the plate 10 are secured thereto by means of lugs extending through apertures in the plate which are then welded thereto and the surface ground smooth to provide rigid motionless connections and leave a smooth surface on the device.

It is likewise frequently desirable to provide an aperture 74 at a convenient place in the plate 10 so that the hand of the operator may readily grasp the holder and the steel square assembly supported thereby to put it in proper position or to carry the same.

In the utilization of the square assembly holder according to the invention a square will be inserted in the slot 16 and clamped against the clamping square supports 20 by means of the setscrews 38 and 40. The preset stop 42 will enable the edge of the body 26 to be maintained in fixed relation to any object being measured. Likewise a suitable square preferably of less size will be clamped on the back of the plate on the square stops 51 and 52 by means of the set screws 64 and 66 so that the tongue of the square will extend perpendicular to the plate 10 and be substantially in the plane of the edge 14 with the body 54 of the square being parallel to the edge 12 and perpendicular to the edge 14.

For purposes of description a preferred embodiment of the invention has been shown and described according to the best present understanding thereof. However, it will be apparent to those skilled in the art that many changes and modifications can be made therein without departing from the true spirit of the invention.

Having described the invention, what is claimed as new is:

1. A square holder comprising a rigid metal plate having first and second edges disposed at right angles to each other, a slot in said first edge disposed substantially parallel to said second edge, said slot being adapted to receive the tongue of a steel square, a plurality of stops adapted to support the body of a square in parallel relation to said second edge, clamping means cooperating with said stops, a stop mounted in the face of said plate in spaced relation to said slot, said stop having a height equal to the width of the body of a steel square.

2. A square holder comprising a rigid metal plate having first and second edges disposed at right angles to each other, a slot in said first edge disposed substantially parallel to said second edge, said slot being adapted to receive the tongue of a steel square, a plurality of stops adapted to support the body of a square in parallel relation to said second edge, clamping means cooperating with said stops, a stop mounted in the face of said plate in spaced relation to said slot, said stop having a height equal to the width of the body of a steel square, a magnet mounted on the back of said plate between said slot and said last mentioned stop.

3. A square holder comprising a rigid metal plate having first and second edges disposed at right angles to each other, a slot in said first edge disposed substantially parallel to said second edge, said slot being adapted to receive the tongue of a steel square, a plurality of stops adapted to support the body of a square in parallel relation to said second edge, clamping means cooperating with said stops, a stop mounted in the face of said plate in spaced relation to said slot, said stop having a height equal to the width of the body of a steel square, a plurality of stops mounted on the back of said plate, said stops being adapted to support the body of a steel square in parallel relation to said first edge, clamping means cooperating with said stops.

4. A square holder comprising a rigid metal plate having first and second edges disposed at right angles to each other, a slot in said first edge disposed substantially parallel to said second edge, said slot being adapted to receive the tongue of a steel square, a plurality of stops adapted to support the body of a square in parallel relation to said second edge, clamping means cooperating with said stops, a stop mounted in the face of said plate in spaced relation to said slot, said stop having a height equal to the width of the body of a steel square, a hand engaging aperture in said plate, said aperture being spaced from said first and second edges.

5. A square assembly holder comprising a metal plate having first and second operating edges, said first and second edges being perpendicular to each other, said plate having a notch in said first edge in spaced parallel relation to said second edge, said notch being adapted to receive the tongue of a carpenter's square, a plurality of square stops mounted on the face of said plate, said square stops adapted to maintain the body of the carpenter's square in parallel relation to said second edge, clamp means adapted to retain the body of the square on the square stops, a set stop mounted on the face of said plate adjacent said first edge and in spaced relation to said slot, a magnet mounted on the back of said plate in proximity to said first edge, a plurality of square stops mounted on the back of said plate, said stops adapted to support a carpenter's square on the back of said plate and in spaced parallel relation to said first edge.

SYLVESTER PANSKE.

References Cited in the file of this patent
UNITED STATES PATENTS

| Number | Name | Date |
| --- | --- | --- |
| 718,913 | Cook | Jan. 20, 1903 |